United States Patent
Sekiya

(10) Patent No.: US 7,742,702 B2
(45) Date of Patent: Jun. 22, 2010

(54) CHIRP SWITCHING CIRCUIT AND OPTICAL TRANSMISSION SYSTEM

(75) Inventor: Motoyoshi Sekiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1003 days.

(21) Appl. No.: 11/360,386

(22) Filed: Feb. 24, 2006

(65) Prior Publication Data

US 2007/0086789 A1   Apr. 19, 2007

(30) Foreign Application Priority Data

Oct. 18, 2005  (JP) .............................. 2005-303362

(51) Int. Cl.
*H04B 10/00* (2006.01)
(52) U.S. Cl. .............................. 398/85; 398/82; 398/199
(58) Field of Classification Search ......... 398/182–201, 398/45, 82
See application file for complete search history.

(56) References Cited

U.S. PATENT DOCUMENTS

| | | | | |
|---|---|---|---|---|
| 5,161,044 A | * | 11/1992 | Nazarathy et al. | 398/194 |
| 5,278,923 A | * | 1/1994 | Nazarathy et al. | 385/3 |
| 5,323,406 A | * | 6/1994 | Yee et al. | 372/26 |
| 5,621,560 A | * | 4/1997 | Wood | 398/183 |
| 5,699,179 A | * | 12/1997 | Gopalakrishnan | 398/194 |
| 5,781,327 A | * | 7/1998 | Brock et al. | 359/249 |
| 5,926,297 A | * | 7/1999 | Ishikawa et al. | 398/43 |
| 5,999,300 A | * | 12/1999 | Davies et al. | 398/185 |
| 6,262,828 B1 | * | 7/2001 | Akiyama et al. | 359/237 |
| 6,763,197 B1 | * | 7/2004 | Hirano et al. | 398/192 |
| 7,200,343 B2 | * | 4/2007 | Ikeuchi | 398/198 |
| 7,266,307 B2 | * | 9/2007 | Shpantzer et al. | 398/193 |
| 2001/0017724 A1 | * | 8/2001 | Miyamoto et al. | 359/158 |
| 2004/0190911 A1 | * | 9/2004 | Franco et al. | 398/189 |
| 2006/0159466 A1 | * | 7/2006 | Kim et al. | 398/188 |
| 2007/0086789 A1 | * | 4/2007 | Sekiya | 398/199 |

FOREIGN PATENT DOCUMENTS

| EP | 0 944 191 | 9/1999 |
|---|---|---|
| JP | 0944191 | 9/1999 |

* cited by examiner

*Primary Examiner*—Agustin Bello
(74) *Attorney, Agent, or Firm*—Staas & Halsey LLP

(57) ABSTRACT

A chirp switching circuit comprises a Mach-Zehnder modulator having a Y-branched part for branching an incoming optical signal into first and second optical signals and an X-branched part merging the first and second optical signals with each other, the Mach-Zehnder modulator causing phase modulation in the first and second optical signals by a modulation signal, and a directional coupling optical switch that switches first and second optical output signals output from the X-branched part of the Mach-Zehnder modulator by merging the first and second output optical signals in response to a chirp switching control signal.

5 Claims, 12 Drawing Sheets

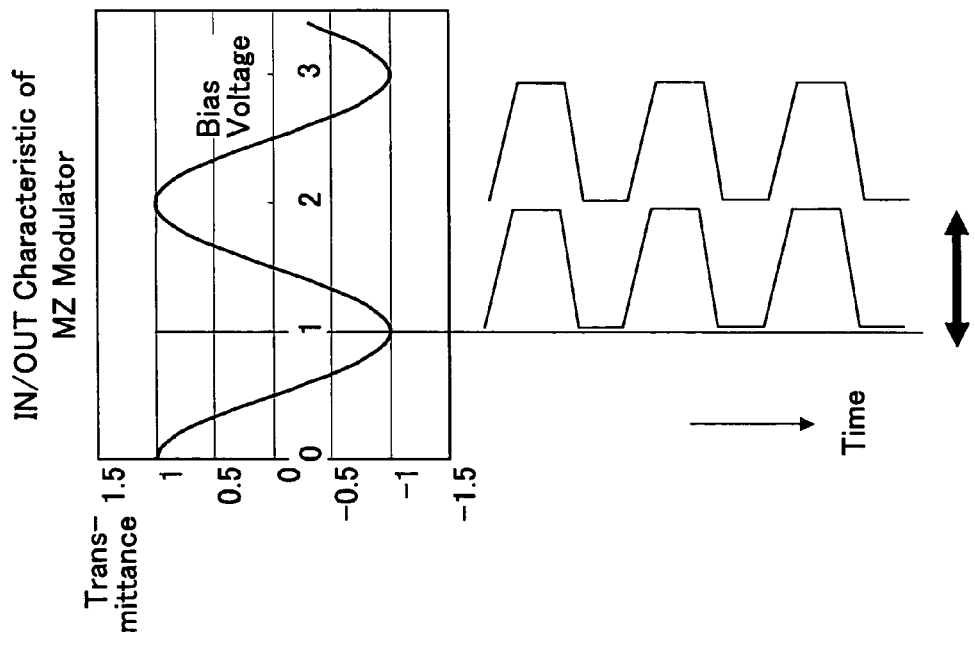
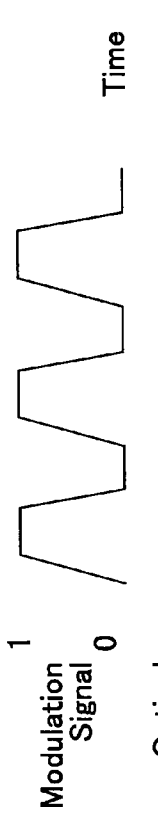
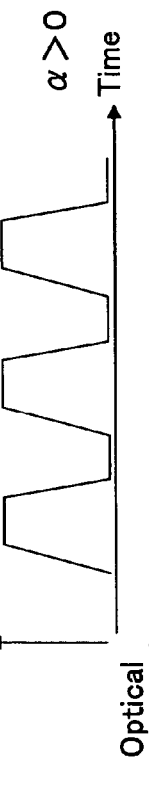
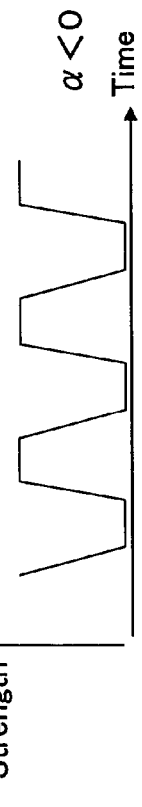
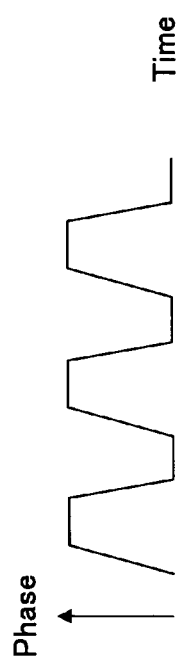
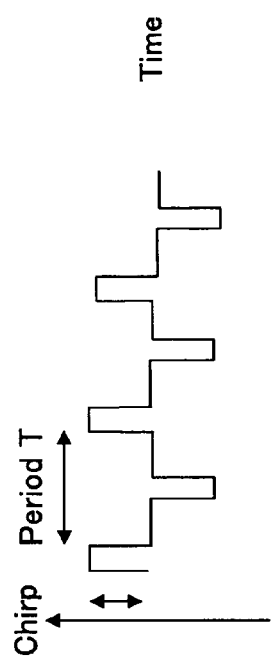

CHIRP SWITCHING CIRCUIT AND OPTICAL TRANSMISSION SYSTEM

CROSS-REFERENCE TO RELATED APPLICATION

The present application is based on Japanese priority application No. 2005-303362 filed on Oct. 18, 2005, the entire contents of which are hereby incorporated by reference.

BACKGROUND OF THE INVENTION

The present invention relates to chirp switching circuits and optical transmission systems and more particularly to a chirp switching circuit for switching transmission chirp and an optical transmission system that uses such a chirp switching circuit.

In view of the needs of increasing transmission capacity, technical development is being undertaken with regard to optical transmission systems in the directions of achieving: higher transmission speed (increase of bit rate); wavelength multiplexing for enabling transmission of plural signals via a single optical fiber at different wavelengths; and increase of transmission distance.

With increase in the transmission speed, there occurs a distortion of signal waveform in the optical signals transmitted through an optical transmission path because of spreading of the spectrum of the optical signals resulting from signal modulation and further from the dispersion pertinent to the signal transmission path. Such distortion of the signal waveform limits the distance that the signal can be transmitted. This distortion of transmitted signal waveform depends upon the mutual relationship between the chirp (time-dependent wavelength shift) that is pertinent to the transmission part and the chirp caused by the dispersion of the transmission path and non-linearity of the transmission path.

In a Mach-Zehnder (MZ) modulator, it is possible to adjust the chirp (time-dependent wavelength shift) of the transmitter output by changing the ratio of phase modulation between the waveguides of two directions. The chirp caused by the transmitter induces a pulse compression or decompression in cooperation with dispersion and chirp of the transmission path, and thus, it is possible to relax the foregoing constraint imposed upon the transmission path length because of dispersion, by suitably choosing a transmission output chirp according to the transmission path condition.

Meanwhile, there arises a situation in which it is desired to switch the chirp of the Mach-Zehnder modulator, as in the case of switching the signal path from the current path to a path where the transmission path conduction such as transmission distance is different. FIGS. 1A and 1B show such an example of switching the signal path from a current (work) path to a reserve (protection) path in an optical transmission system of ring structure.

Referring to FIGS. 1A and 1B, the optical transmission system is constructed by nodes $10a$-$10f$ connected in the form of a ring, wherein each of the nodes $10a$-$10f$ achieves optical amplification and compensation of dispersion. Thus, when an optical signal is to be transmitted from a transmission part 11 to a receiving part 12, the node $10b$ usually chooses a current path A that reaches the node $10b$ from the node $10a$ in a clockwise direction as shown in FIG. 1A.

On the other hand, when there occurs a failure in the optical transmission path between the nodes $10a$ and $10b$, the transmission path is switched to a reserve path B that reaches from the node $10a$ to the node $10d$ in the anti-clockwise direction via the nodes $10f$, $10e$, $10d$ and $10c$.

Here, let us assume that the path A has a negative residual dispersion and the path B has a positive residual dispersion.

As can be seen from FIG. 3 that shows the relationship between the residual dispersion and the sign of the chirp, use of positive chirp is suited in the case there is a negative residual chirp, while in the case the residual dispersion is positive, it is suitable to use a negative chirp. Thus, when there is a need to switch the transmission path from the path A to the path B, there is a need of switching the transmission chirp from positive to negative.

FIG. 4 shows an example of the chirp switching circuit that uses a conventional Mach-Zehnder optical modulator.

Referring to FIG. 4, the Mach-Zehnder optical modulator divides the light coming in from an optical source 15 into two, different optical waveguides 17 and 18 at a Y-branching part 16, wherein the respective lights undergo phase change in the optical waveguides 17 and 18 and are merged again at a Y-branched part 19. Thereby, On/Off control is achieved for the optical signal based on the phase difference thus induced.

FIG. 5A shows input/output characteristics of the chirp switching circuit that uses such a Mach-Zehnder optical modulator, while FIGS. 5B-5F show input/output signal waveforms of the chirp switching circuit.

In the Mach-Zehnder modulator, the logic value of an input signal (electric signal) shown in FIG. 5B is inverted by a high-speed driver circuit 21 and the operational point of the Mach-Zehnder modulator is shifted by an operational point stabilization circuit 22 at the same time. With this, there is caused inversion in the transmission chirp. It should be noted that FIG. 5B shows the optical intensity in the optical waveguide 17 while FIG. 5C shows the optical intensity in the optical waveguide 18. Further, FIG. 5D shows the phase of the output optical signal while FIG. 5F shows the chirp caused in the output optical signal.

Because the optical amplifier in each of the nodes $10a$-$10f$ has a time-dependence in the response characteristics thereof, there occurs a change of output when there is caused a change in the input, wherein there are cases in which such a change is accumulated. It should be noted that such accumulated change of optical signals may cause overload or even damage in the optical components at the reception side or at the intermediate position on the signal transmission path. Thus, in the case there is provided optical amplifiers in the transmission path and in the case there is going to be made switching of chirp in correspondence to the switching of transmission path from the current transmission path to a transmission path of different path condition, it is desired that the change of optical output caused with the switching of chirp is suppressed as much as possible.

Parent Reference 1 teaches the technology of obtaining a chirped optical signal of inverted polarity by changing the operational point of the Mach-Zehnder optical modulator in correspondence to the chirp polarity.

PATENT REFERENCE 1 Japanese Laid-Open Patent Application 11-266200

SUMMARY OF THE INVENTION

In order to switch the transmission chirp of a Mach-Zehnder optical modulator, there is a need of shifting the operational point of the Mach-Zehnder optical modulator simultaneously to inversion of logic value of an input signal. Because a Mach-Zehnder optical modulator has a transmission characteristic repeated periodically as shown in FIG. 6A, there is caused a transition in the transmission chirp from a state a in which the transmission chirp is positive ($\alpha$>0) to a state b corresponding to the top or bottom of the transmission characteristic and further to a state c in which the transmission chirp is negative (α<0). Reference should be made to FIG. 6B.

In this process, there is caused an increase (or decrease) of output from the transmission part. This means that it is inevitable that there is caused a time-dependent variation in the optical output with the switching of the transmission chirp. When this time-dependent variation of optical output is used with the optical transmission system that uses an optical amplifier in each node, there is caused an optical surge because of the variation at the input of the optical amplifier, while accumulation of such optical surge may cause error at the reception side after the reception of the optical signal.

In order to avoid this problem, there is a need of suppressing the operation of the optical amplifier in each node temporarily, while such an approach increases the time needed for switching the transmission chirp.

The present invention has been made in view of the foregoing problems and has its object of providing a chirp switching circuit and an optical transmission system capable of suppressing the variation of optical output associated with switching of the transmission chirp and thus capable of suppressing occurrence of error caused by optical surge.

In a first aspect, the present invention eliminates the variation of optical output at the time of switching a transmission chirp by a chirp switching circuit comprising:

a Mach-Zehnder modulator having a Y-branched part for branching an incoming optical signal into first and second optical signals and an X-branched part merging said first and second optical signals with each other, said Mach-Zehnder modulator causing phase modulation in said first and second optical signals by a modulation signal; and a directional coupling optical switch that switches first and second optical output signals output from said X-branched part of said Mach-Zehnder modulator by merging said first and second output optical signals in response to a chirp switching control signal.

The Mach-Zehnder modulator may adjust a magnitude of chirp by changing a depth of modulation in the phase modulation of the first and second optical signals in response to the chirp switching control signal.

In a preferred embodiment, said Mach-Zehnder modulator adjusts an absolute value of a chirp by carrying out said phase modulation of said first and second optical signals by changing a degree of modulation of said modulation waves in response to said chirp switching signal.

In another aspect, there is provided an optical transmission system, comprising:

a current path;

a reserve path; and a transmission part transmitting an optical signal to said current path and said reserve path, said optical transmission system switching from said current path to said reserve path when there is a failure in said current path, said transmission part comprising a chirp switching circuit comprising:

a Mach-Zehnder modulator having a Y-branched part for branching an incoming optical signal into first and second optical signals and an X-branched part merging said first and second optical signals with each other, said Mach-Zehnder modulator causing phase modulation in said first and second optical signals by a modulation signal; and a directional coupling optical switch that switches first and second optical output signals output from said X-branched part of said Mach-Zehnder modulator by merging said first and second output optical signals in response to a chirp switching control signal, said chirp switching circuit switching a transmission chirp, when it becomes necessary, concurrently to switching from said current path to said reserve path.

In a preferred embodiment, a sign of said transmission chirp is predetermined for all of said current path and said reserve path.

In another preferred embodiment, said Mach-Zehnder modulator and said directional coupler optical switch uses a LiNbO$_3$ crystal.

According to the present invention, it becomes possible to suppress the variation of optical output at the time of switching the transmission chirp and it becomes possible to prevent occurrence of error caused by optical surge.

Other objects and further features of the present invention will become apparent from the following detailed description when read in conjunction with the attached drawings.

BRIEF DESCRIPTION OF THE DRAWINGS

FIGS. 5A-5F are diagrams showing the input/output characteristics and input/output signal waveforms of the chirp switching circuit according to a related art that uses a Mach-Zehnder optical modulator;

DETAILED DESCRIPTION OF THE INVENTION

Hereinafter, the present invention will be explained with reference to the drawings.

Embodiment

Figure 1B:
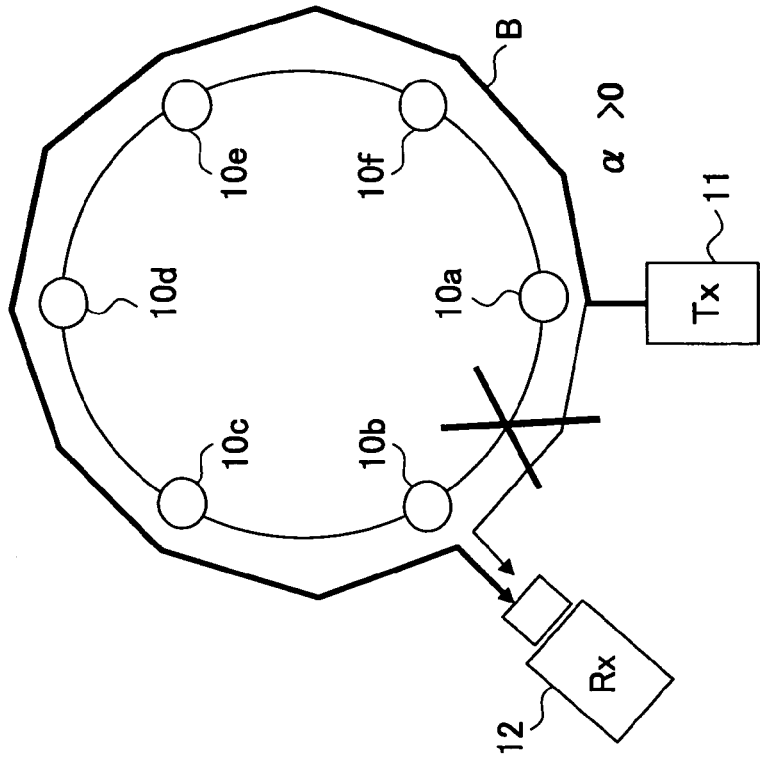
FIGS. 1A and 1B are diagrams explaining the switching of path from a current path to a reserve path in an optical transmission system of a conventional ring construction.
Figure 1A:
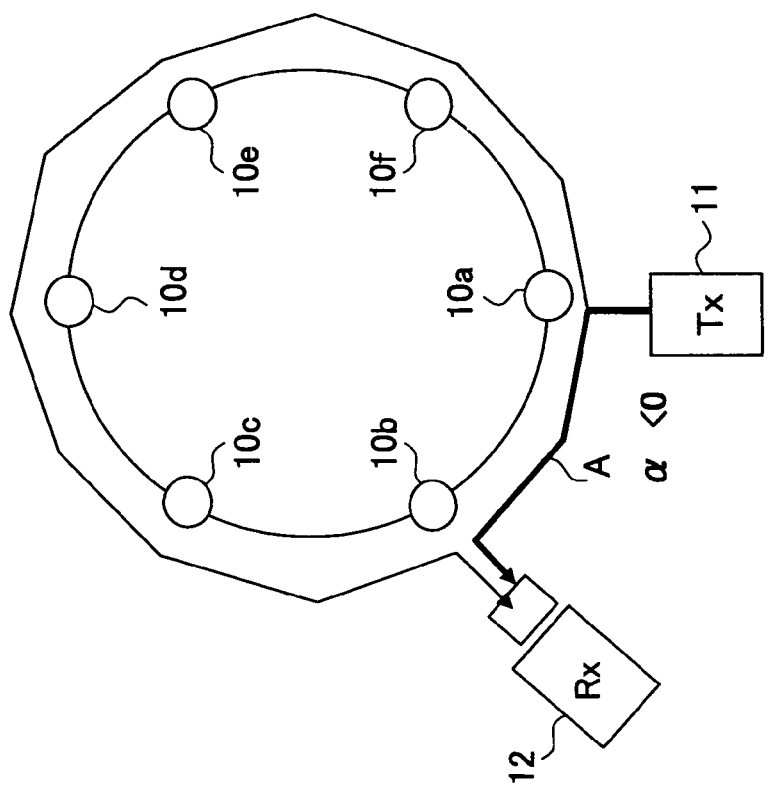
Figure 2:
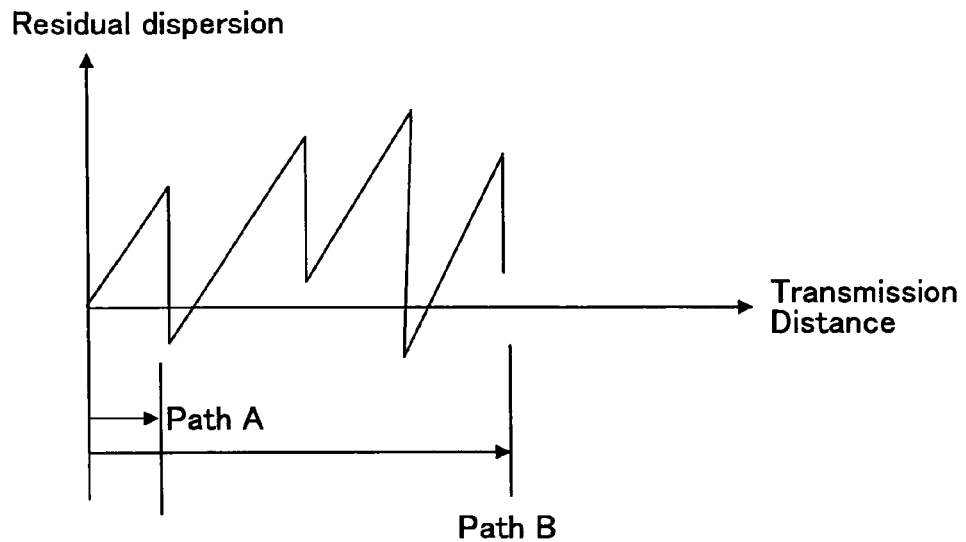
FIG. 2 is a diagram showing the relationship between a transmission distance and residual dispersion.
Figure 3:
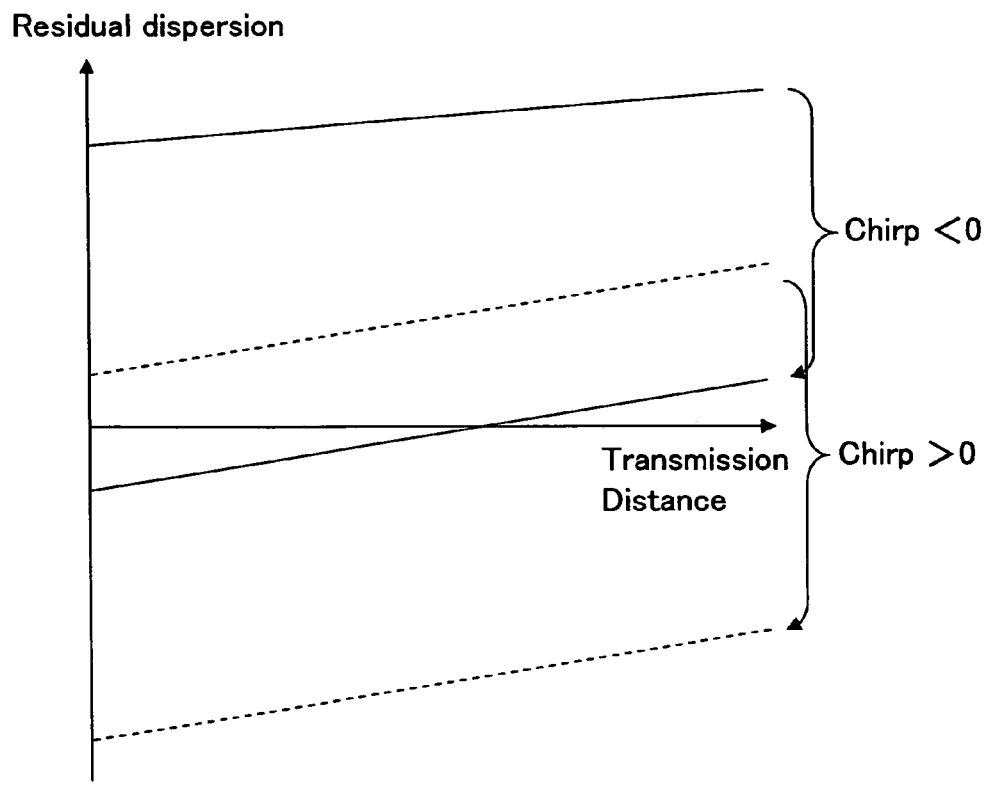
FIG. 3 is a diagram showing the relationship between a transmission distance and chirp.
Figure 4:
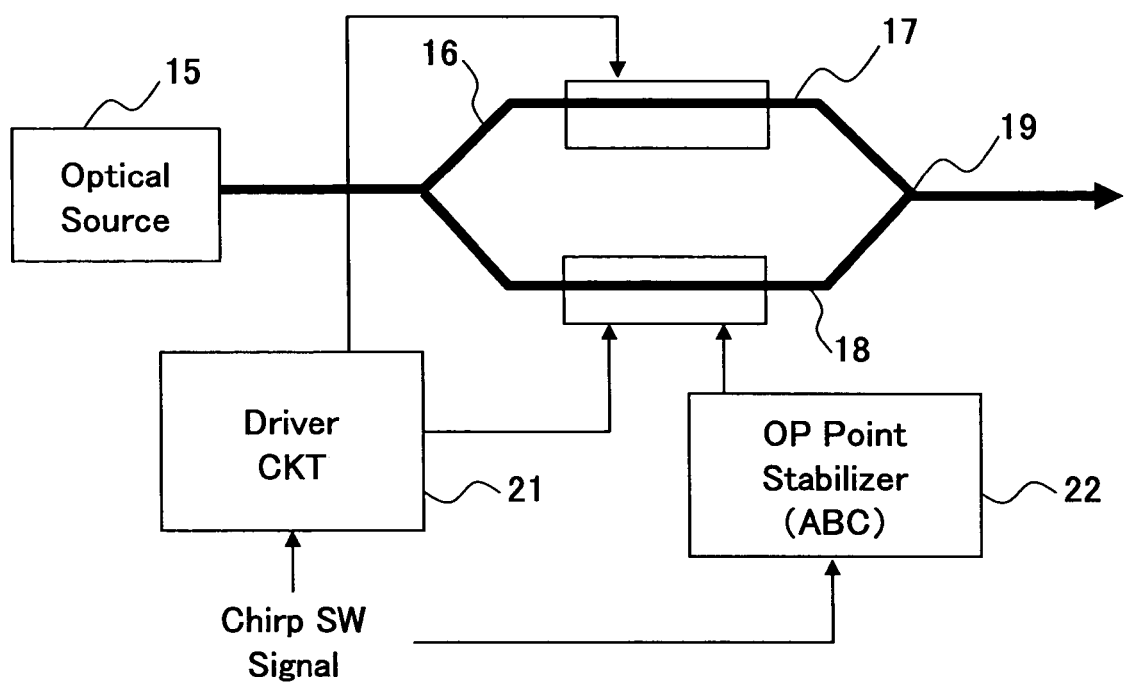
FIG. 4 is a diagram showing the construction of a chirp switching circuit that uses a conventional Mach-Zehnder optical modulator.
Figure 6B:
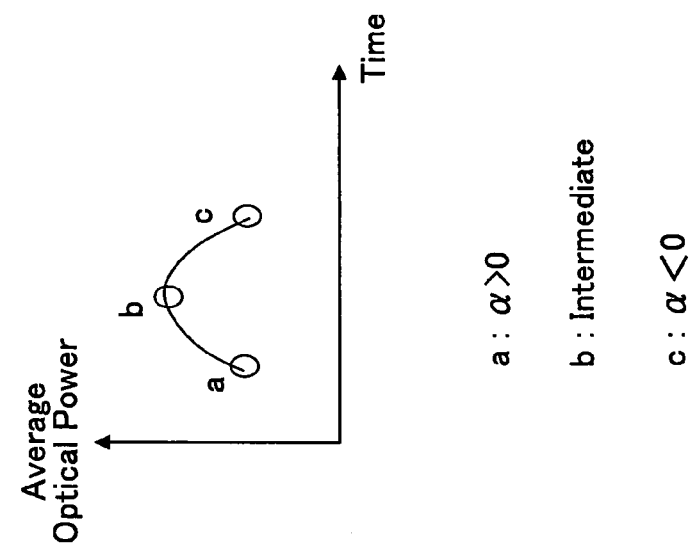
FIGS. 6A and 6B are diagrams explaining the problem of output variation caused with chirp switching in the chirp switching circuit of FIG. 4.
Figure 6A:
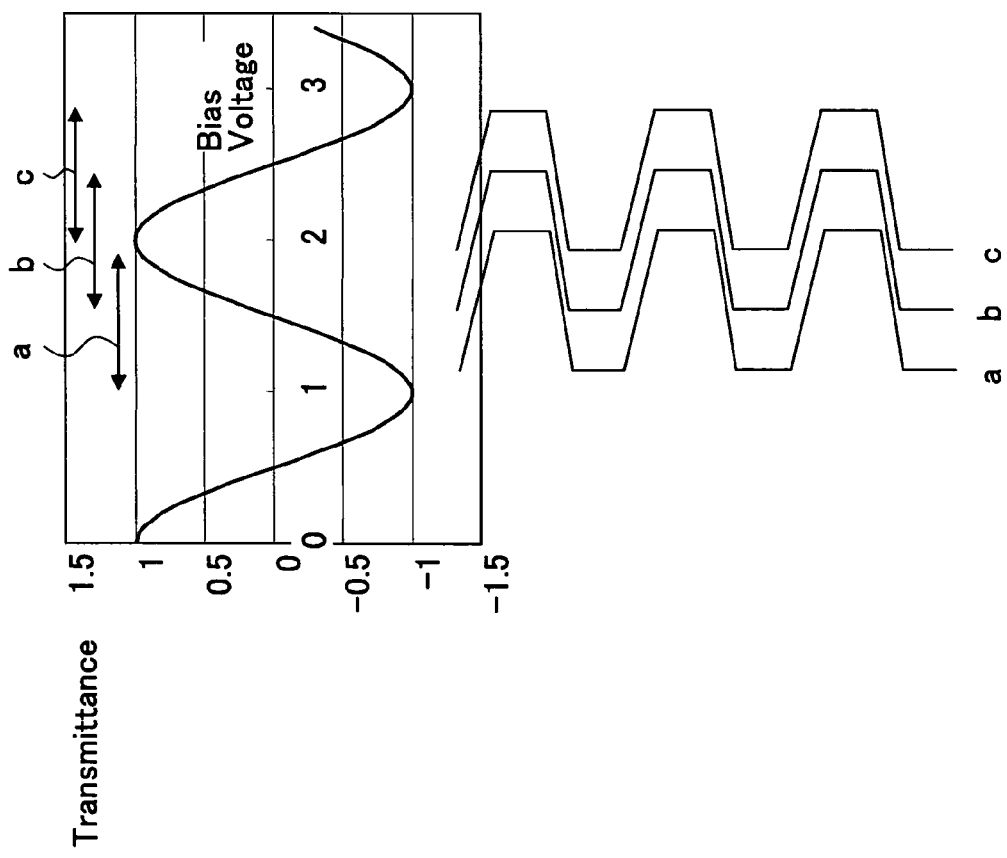
Figure 7:
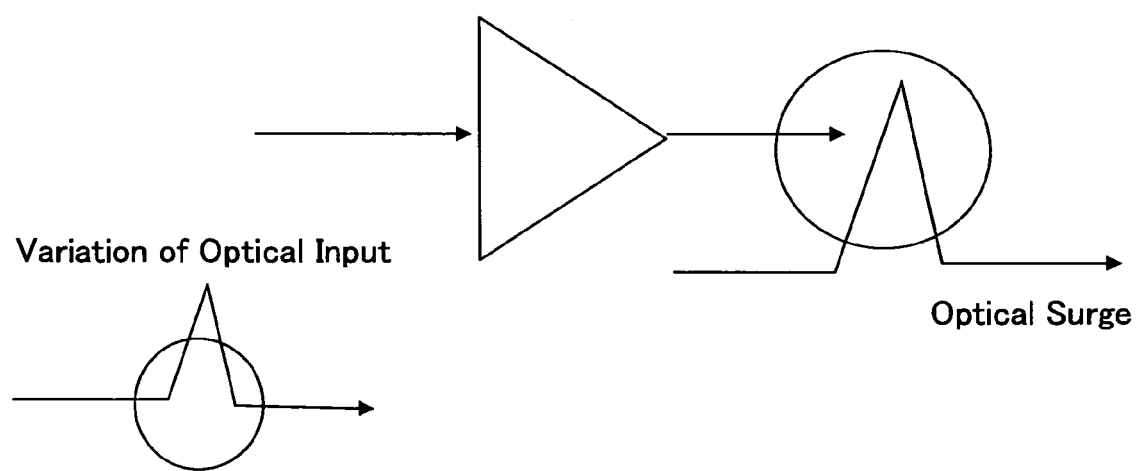
FIG. 7 is a diagram explaining the occurrence of optical surge as a result of input variation in an optical amplifier.
Figure 8:
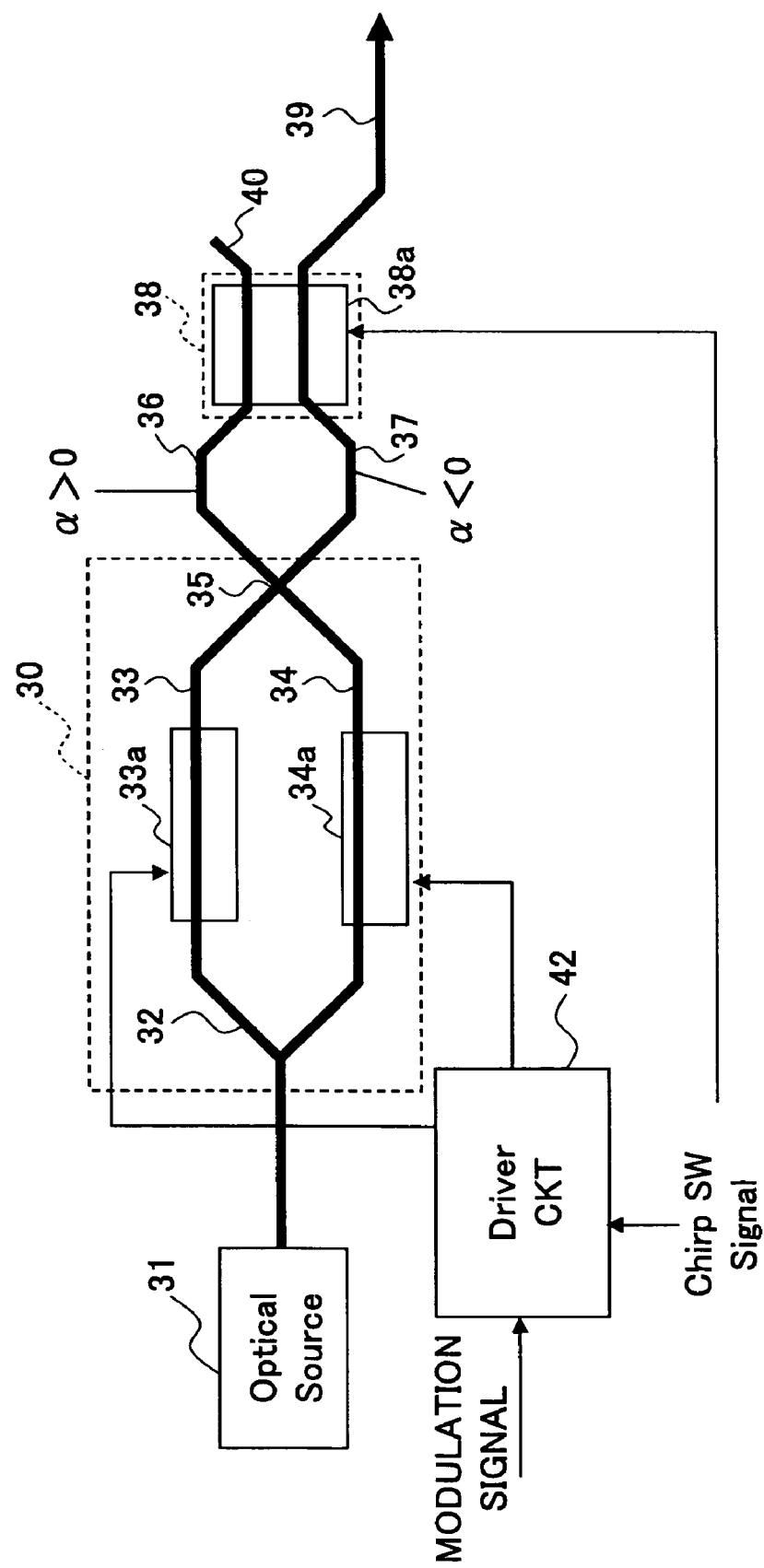
FIG. 8 is a diagram showing the construction of a chirp switching circuit according to an embodiment of the present invention.
Figure 9:
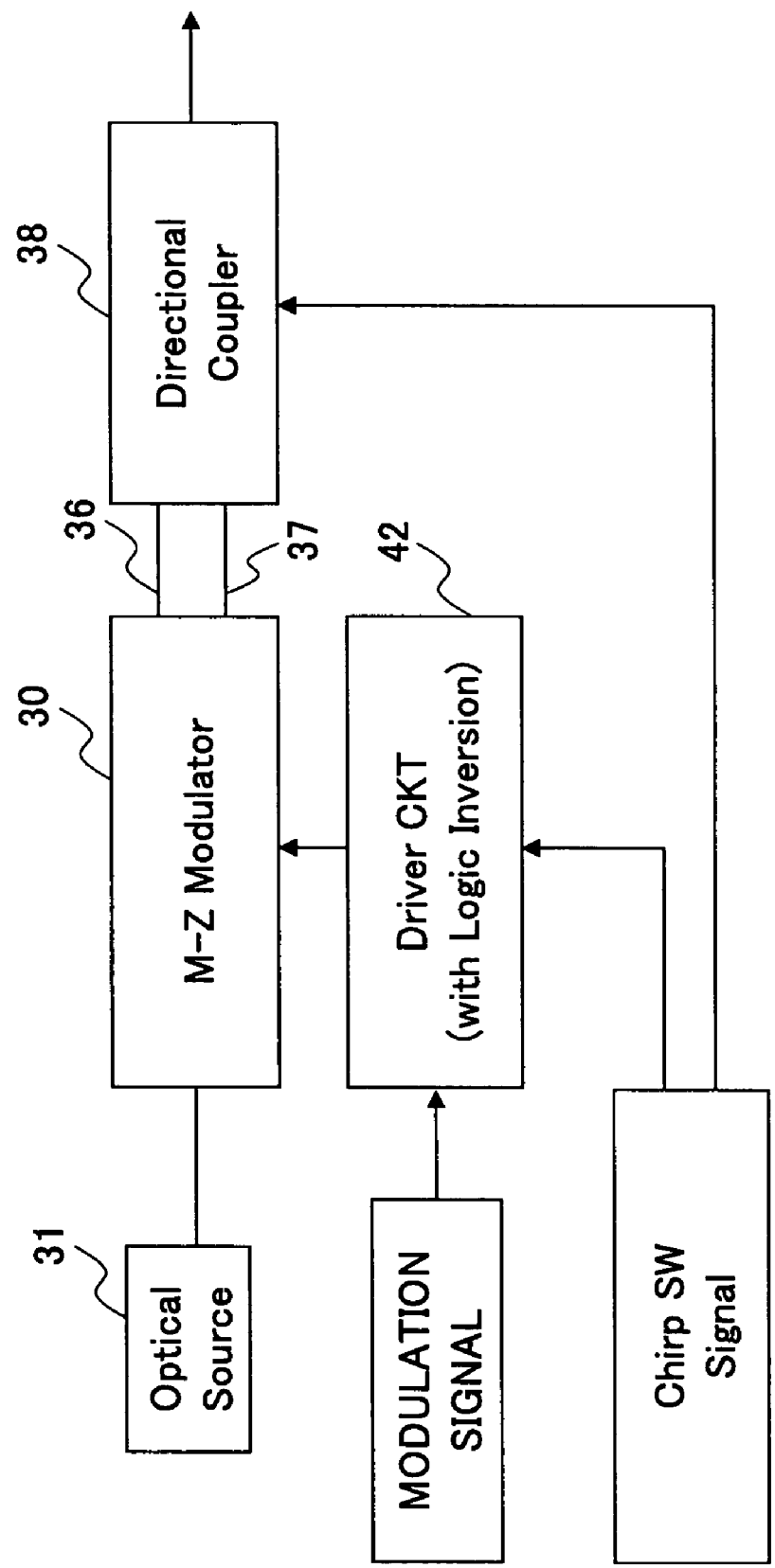
FIG. 9 is a block diagram showing the construction of a chirp switching circuit according to an embodiment of the present invention.

FIG. 8 shows the construction of a chirp switching circuit according to an embodiment of the present invention, while FIG. 9 shows a block diagram thereof.

Referring to FIGS. 8 and 9, a Mach-Zehnder optical modulator 30 divides an optical beam coming in from an optical source 31 at a Y-branched part 32 and directs a first optical beam to an optical waveguide 33 and a second optical beam to an optical waveguide 34. The optical waveguides 33 and 34 include respective phase modulators 33a and 34a, and the phase modulators 33a and 34a cause phase modulation respectively in the first and second optical beams traveling through the optical waveguides 33 and 34.

The first and second optical beams thus modulated are merged at a X-branched part 35, and first and second output optical beams output from the X-branched part 35 are directed further to optical waveguides 36 and 37. The first and second output optical beams are then injected to a directional coupler optical switch 38 from the optical waveguides 36 and 37, wherein the optical switch 38 provides an optical output to one of output optical waveguides 39 and 40. In the present case, the output optical beam is provided to the output optical waveguide 39, and the output optical waveguide 40 is provided as a dummy waveguide.

The phase modulators 33a and 34a of the optical waveguides 33 and 34 are provided with a modulation signal of GHz frequency from a high-speed driving circuit 42.

Figure 10:
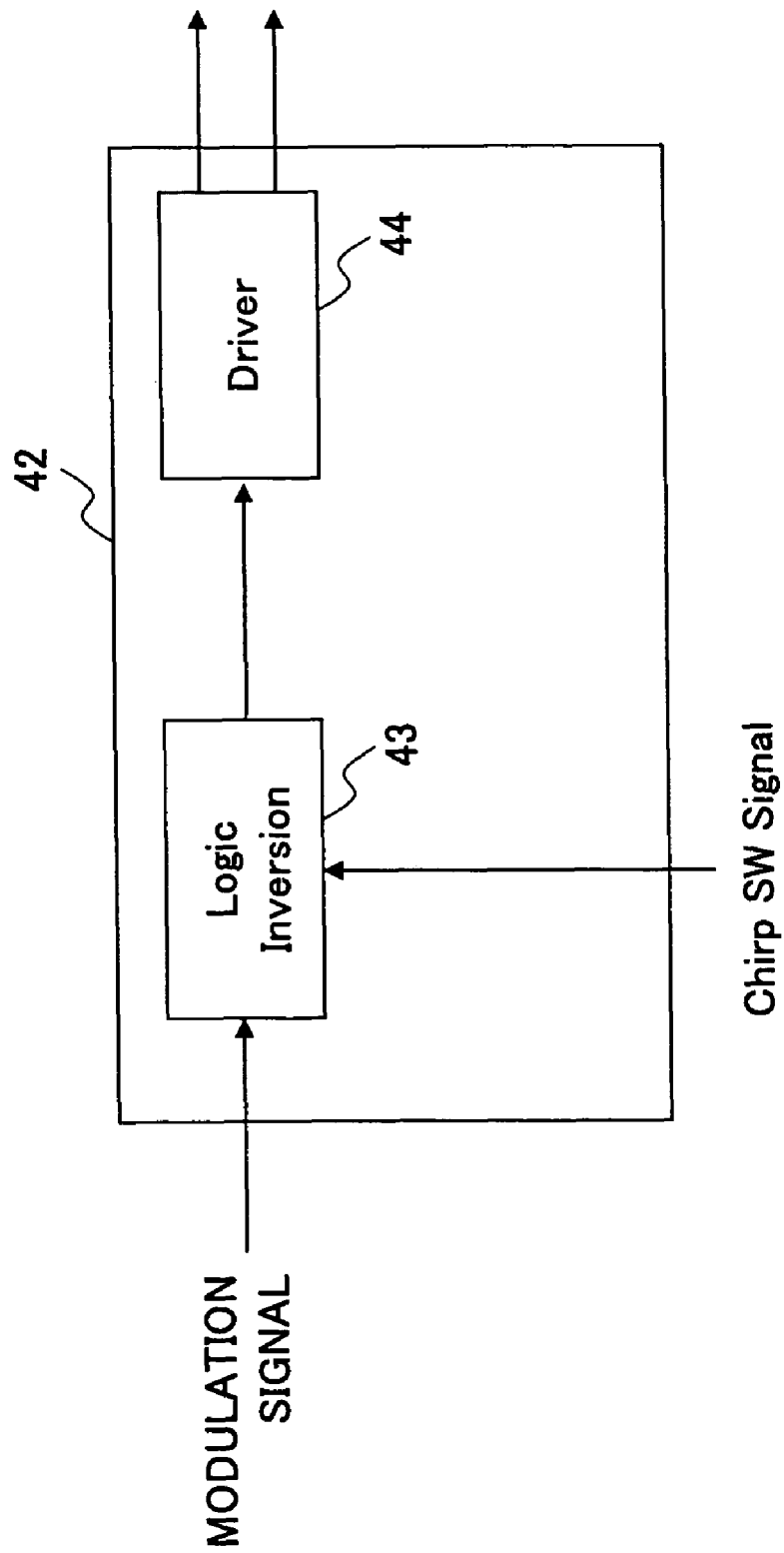
FIG. 10 is a block diagram showing the construction of a high-speed driver circuit used with the chirp switching circuit of FIG. 8.

As shown in FIG. 10, the high-speed driver circuit 42 includes a logic inversion part 43 and a driver 44, wherein the logic inversion part 43 is supplied with a modulation signal and chirp switching signal and provides the modulation signal as output without inversion when the chirp switching signal has a logic value 0, while when the chirp switching signal has a logic value 1, the logic inversion part 43 provides the modulation signal as output with logic inversion. Thereby the driver 44 amplifies the output modulation signal of the logic inversion part 43.

Further, the chirp switching signal is supplied also to a phase modulator 38a of the directional coupler optical switch 38. The phase modulators 33a, 34a and 38a can be constructed on a crystal substrate of LiNbO$_3$, GaInAsP/InP, or GaN.

It should be noted that the X-branched part 35 of the Mach-Zehnder optical modulator 30 provides output optical signals of complementary phase at the output optical waveguides 36 and 37 such that when one the output optical signal in one of the optical waveguides is ON, then the output optical signal in the other of the optical waveguides is OFF. Thereby, the complementary output optical signals of the optical waveguides 36 and 37 have the same phase. Thus, mutually inverted optical outputs are obtained with the same phase with such a construction.

Figure 11A:
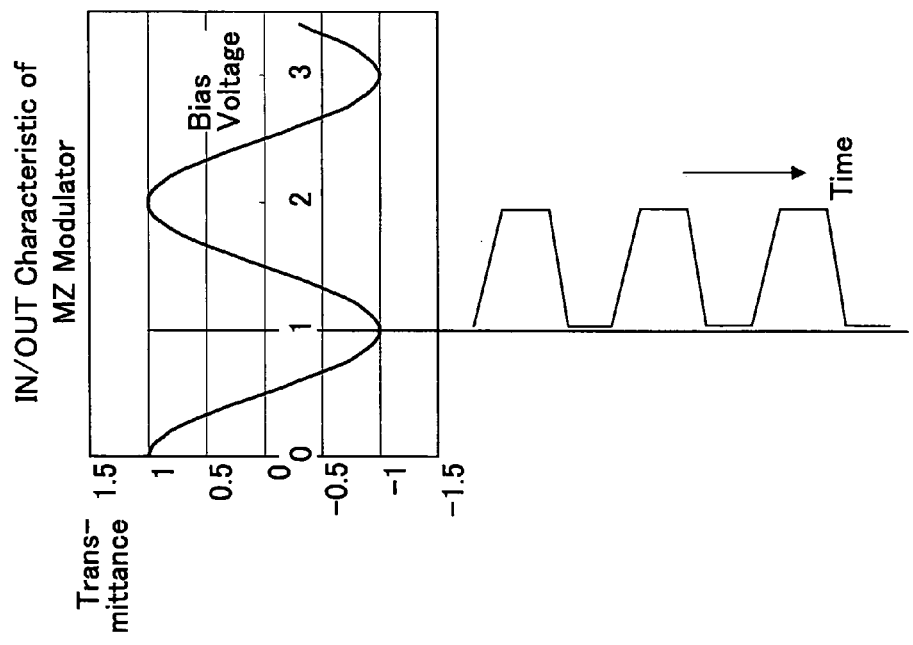
FIGS. 11A-11F are diagrams showing the input/output characteristics and input/output signal waveforms of the chirp switching circuit according to the embodiment of FIG. 8 that uses a Mach-Zehnder optical modulator.
Figure 11B:
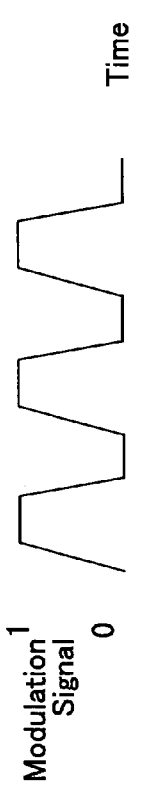
Figure 11C:
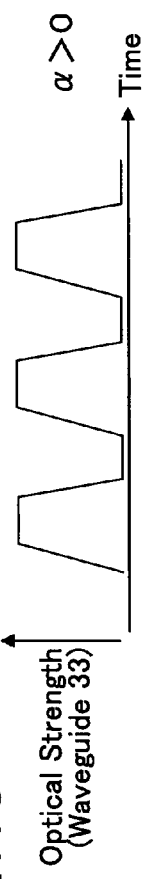
Figure 11D:
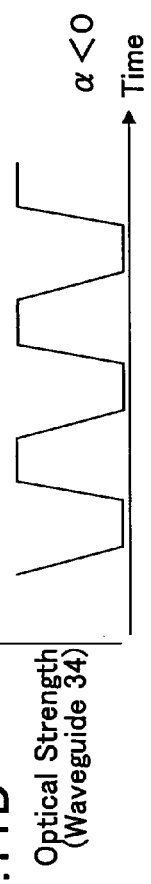
Figure 11E:
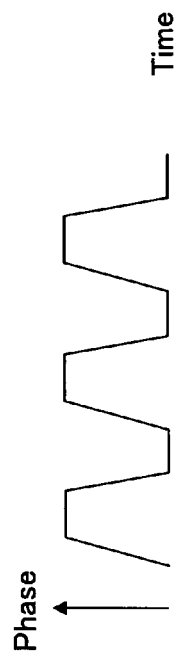
Figure 11F:
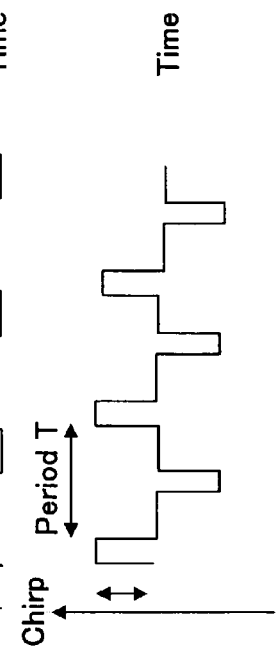

FIG. 11A shows the input/output characteristic of the Mach-Zehnder optical modulator 30 while FIG. 11B shows the waveform of the modulation signal. Further, FIGS. 11C and 11D show the waveforms of the output optical signals of the optical waveguides 33 and 34 respectively, while FIG. 11E shows the phase of the output optical signals. Further, FIG. 11F shows the waveform of the chirp.

Equation (1) represents an a parameter, which is the parameter representing the magnitude of the chirp, in terms of the optical intensity S and the optical phase $\phi$.

$$\alpha = 2 \cdot S (\delta\phi/\delta t)/(\delta S/\delta t) \tag{1}$$

Referring to Equation (1), it can be seen that, in view of the complementary relationship of the output signals in the optical waveguides 36 and 37, the term $\delta S/\delta t$ at the denominator indicates that the chirp in the two outputs from the X-branched part 35 are mutually inverted.

It should be noted that the magnitude a of the chirp is defined as $$E_1(t, z=0) = \sqrt{\frac{S_o}{2}} \exp[j(\omega_0 t + \eta_a V(t))]$$

$$E_2(t, z=0) = \sqrt{\frac{S_o}{2}} \exp[j(\omega_0 t + \eta_b V(t))]$$

$$\alpha = 2S \frac{d\phi}{dt} \bigg/ \frac{dS}{dt}$$

$$= S_o(1 + \cos(\pi V(t)/V_\pi)) \frac{\pi(\eta_a - \eta_b)}{2V_\pi(\eta_a + \eta_b)} \frac{dV(t)}{dt} \bigg/$$

$$- \frac{S_o \pi}{2V_\pi} \sin\left(\frac{\pi V(t)}{V_\pi}\right) \frac{dV(t)}{dt}$$

$$= -\frac{\eta_a - \eta_b}{\eta_a + \eta_b} \tan^{-1}\left(\frac{\pi V(t)}{V_\pi}\right)$$

$$\alpha_{ML} = -\frac{\eta_a - \eta_b}{\eta_a + \eta_b} \quad (0 \le V(t) \le V_\pi)$$

$$\alpha_{MZ} = -\frac{\eta_a - \eta_b}{\eta_a + \eta_b} \quad (V_\pi \le V(t) \le 2V_\pi)$$

wherein $E_1(t, z=0)$ represents the electric field strength of the optical waveguide 33, $E_2(t, z=0)$ represents the electric field strength of the optical waveguide 34, $S_o$ represents the incident optical intensity, $\eta_a$ represents the phase modulation efficiency of the optical waveguide 33 and $\eta_b$ represents the phase modulation efficiency of the optical waveguide 34. Further, it should be noted that $\omega_o$ is the angular frequency of the light, V(t) is the voltage, $V_\pi$ is the V pi voltage of the Mach-Zehnder modulator, while $\alpha_{MZ}$ is the $\alpha$ parameter of the Mach-Zehnder modulator.

Next, the characteristics of the directional coupler optical switch 38 will be examined.

The directional coupler optical switch 38 is a device that causes a phase difference between the optical signals in the two optical waveguides 36 and 37 and selects one of the optical output waveguides 39 and 40 to which the optical output is to be provided. Thereby, the total optical intensity of the two output optical waveguides 39 and 40 is held equal to the total optical intensity of the optical waveguides 36 and 37.

Because the output optical waveguides 36 and 37, extending out from the X-branch 35 of the Mach-Zehnder optical modulator 30, serve for the input optical waveguides of the optical directional coupler 38, a constant total optical intensity equal to the total optical intensity of the optical waveguides 36 and 37 is maintained for the optical output signals in the optical waveguides 39 and 40. Only the ratio of the optical intensity is changed between the optical waveguides 39 and 40.

Here, it should be noted that, while the chirp output from the X-branched part 35 are inverted with each other between the output waveguides 36 and 37, average of the optical output of the two optical waveguides 36 and 37 becomes constant and unchanged. Thus, the optical output in the optical waveguide 39 is held constant during the switching operation of the directional coupler optical switch 38. In other words, there is no fluctuation of optical output during the switching operation as shown in FIG. 12.

Figure 12:
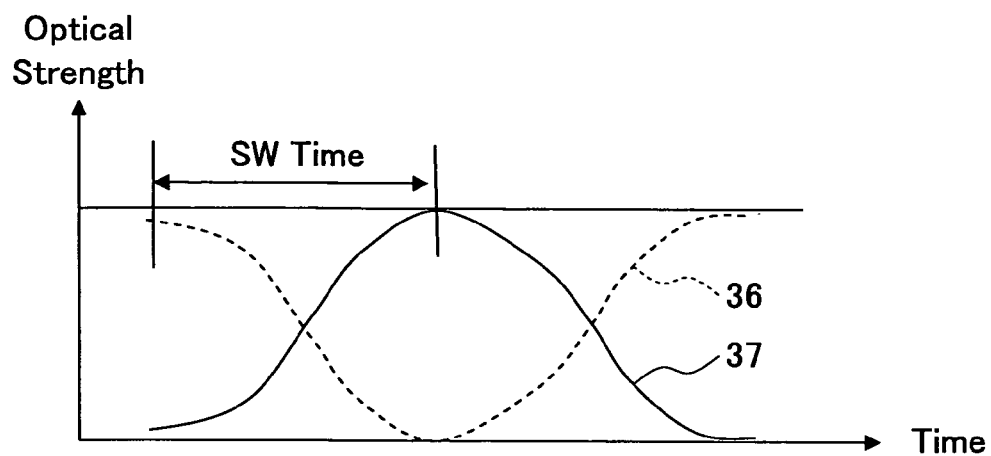
FIG. 12 is a diagram showing the characteristics of the directional coupler optical switch used with the chirp switching circuit of FIG. 8.

FIG. 12 represents the optical intensity component of the optical waveguide 36 in the output optical waveguide 40 during the switching operation by a broken line and the optical intensity component of the optical waveguide 37 in the output optical waveguide 40 during the switching operation by a continuous line.

Designating the optical intensities in the optical waveguides 36 and 37 as Iin1 and Iin2 and the optical intensities in the optical waveguides 40 and 39 as Iout1 and Iout2 respectively, there hold the equations $$Iin1+Iin2=Iout1+Iout2$$

$$Iout1=a \cdot Iin1+(1-a) \cdot Iin2$$

$$Iout2=(1-a) \cdot Iin1+a \cdot Iin2,$$

wherein a represents the mixing ratio of the optical directional coupler 38.

Thus, in the case of Iin2=Iin1, there holds the relationship $$Iout2=Iin1$$

for arbitrary value of the mixing ratio a.

Strictly speaking, Iin1 and Iin2 changes with time because of the modulation. However, the speed of modulation is sufficiently high, and it is possible to consider the distribution of the optical power in terms of averaged optical power.

Figure 13:
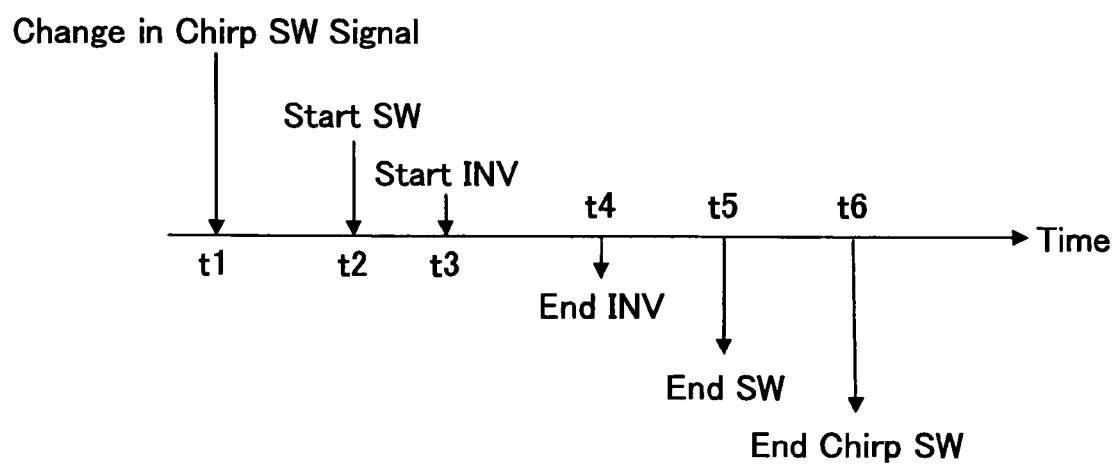
FIG. 13 is a diagram showing the chirp switching sequence according to the embodiment of the present invention.

FIG. 13 shows a chirp switching sequence.

Referring to FIG. 13, the logic value of the chirp switching signal causes transition from 0 to 1 (or from 1 to 0) at a time t1.

Thereby, the optical directional coupler switch 38 starts the switching operation at a time t2 and the logic inversion part 43 starts logic inversion at a time t3.

Thereafter, the logic inversion part 43 completes the logic inversion at a time t5, and the directional optical coupler switch 38 completes the switching operation at a time t6. The duration from t2 to t6 is in the order of ten milliseconds to several ten milliseconds and falls in the time interval allowed in an optical transmission system for path switching.

Thus, with he present embodiment, it becomes possible to eliminate the time-dependent variation of optical signal strength at the time of inverting the transmission chirp of the optical signal output to the output optical waveguide 39.

Next, switching from the current path to the reserve path will be explained for the case of the optical transmission system of the ring structure with reference to FIGS. 14A and 14B.

Figure 14B:
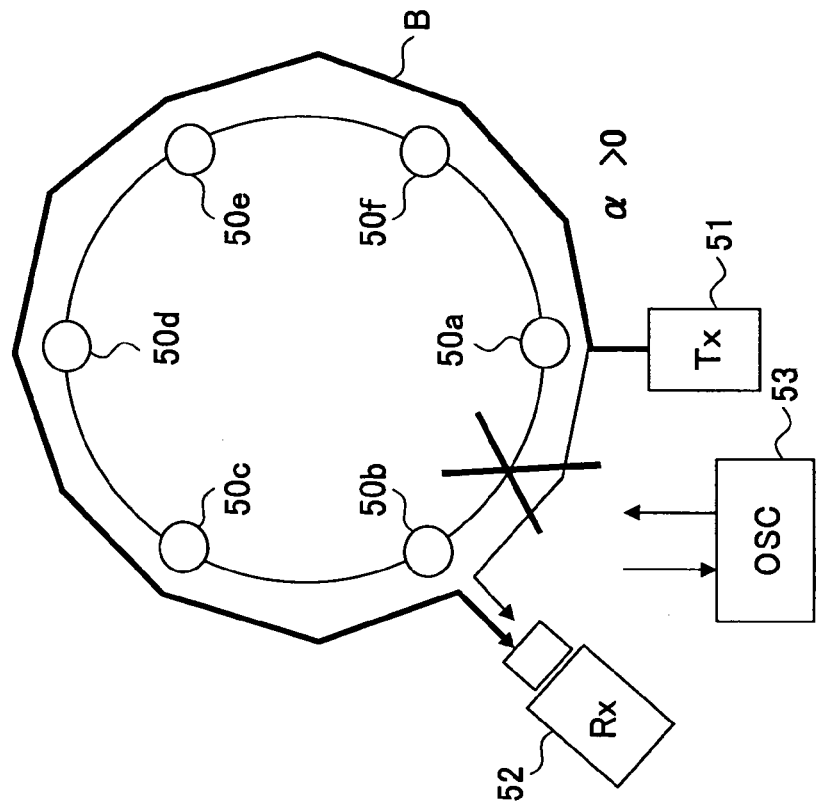
FIGS. 14A and 14B are diagrams explaining switching of the path from the current path to the reserve path in an optical transmission system of ring structure.
Figure 14A:
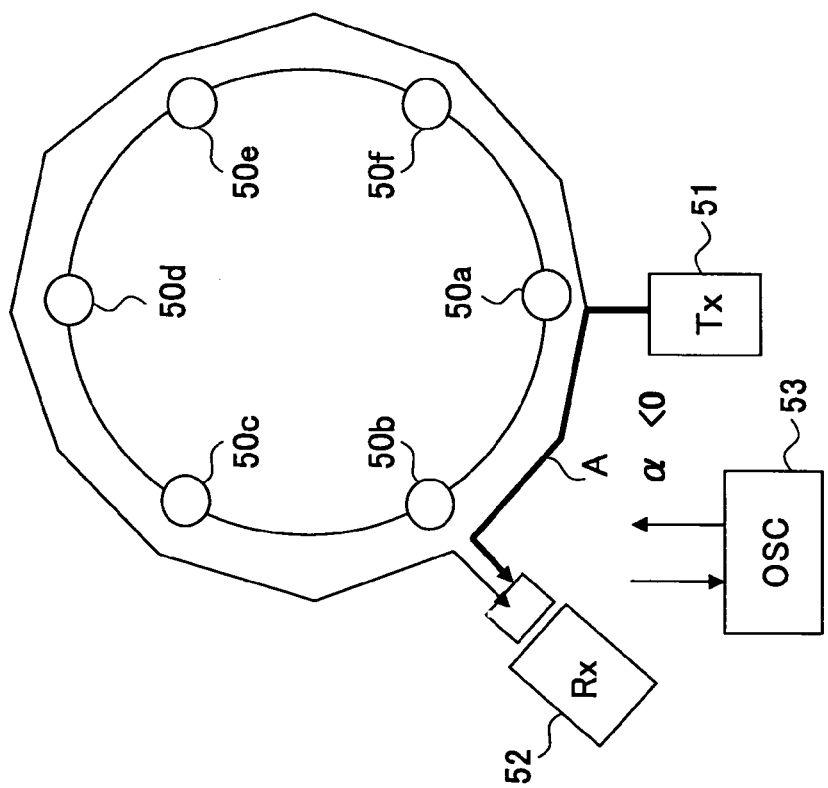

Referring to FIGS. 14A and 14B, there is formed an optical transmission system by nodes 50a-50f that are connected to form a ring structure, wherein it should be noted that each of the nodes 50a-50f performs optical amplification and dispersion compensation.

In the case of transmitting an optical signal from a transmission part 51 to a reception part 52, it is usual that the node 50b selects a current path A that reaches the node 50b from the node 50a in a clockwise direction as shown in FIG. 14A. In this normal situation, the transmission part provides a negative transmission chirp α.

Now, when there is caused a failure in the optical transmission path between the node 50a and the node 50b, the node 50b detects the loss of signal and notifies this to the node 50a and the transmission part 51 via an optical supervisory channel (OSC) 53.

In response thereto, the transmission part 51 switches the transmission chirp α to positive, and the node 50a switches the path to a reserve path B that reaches the node 50b via the nodes 50f, 50e, 50d and 50c in the anticlockwise direction as shown in FIG. 14B. Further, the node 50b also selects the reserve path B that reaches the node 50b from the node 50a in the clockwise direction.

Thereby, it should be noted that the optical supervisory channel 53 holds the positive and negative sings of the transmission chirp determined optimally for all of the transmission paths.

What is claimed is:

1. A chirp switching circuit, comprising:
a Mach-Zehnder modulator having a Y-branched part for branching an incoming optical signal into first and second optical signals and an X-branched part merging said first and second optical signals with each other, said Mach-Zehnder modulator causing phase modulation in said first and second optical signals by a modulation signal; and
a directional coupling optical switch that switches first and second optical output signals output from said X-branched part of said Mach-Zehnder modulator by merging said first and second output optical signals in response to a chirp switching control signal wherein
said directional coupling optical switch outputting said first optical output signal in a first output optical waveguide of said X-branched optical switch to an output optical waveguide of said directional coupling optical switch when a control signal is applied with a first logic level, and said directional coupling optical switch outputting said second optical output signal in a second output optical waveguide of said X-branched optical switch to said output optical waveguide of said directional coupling optical switch when said control signal is applied with a second logic level.

2. A chirp switching circuit as claimed in claim 1, wherein said Mach-Zehnder modulator adjusts a magnitude of chirp by changing a depth of modulation in said phase modulation of said first and second optical signals in response to said chirp switching control signal.

3. The chirp switching circuit as claimed in claim 1, wherein said Mach-Zehnder modulator and said directional coupler optical switch are constructed on an LiNbO3 crystal substrate.

4. The chirp switching circuit as claimed in claim 1, wherein said Mach-Zehnder modulator and said directional coupler optical switch are constructed on a GaInAsP/InP crystal substrate.

5. The chirp switching circuit as claimed in claim 1, wherein said Mach-Zehnder modulator and said directional coupler optical switch are constructed on a GaN crystal substrate.

* * * * *

UNITED STATES PATENT AND TRADEMARK OFFICE
CERTIFICATE OF CORRECTION

PATENT NO. : 7,742,702 B2
APPLICATION NO. : 11/360386
DATED : June 22, 2010
INVENTOR(S) : Motoyoshi Sekiya It is certified that error appears in the above-identified patent and that said Letters Patent is hereby corrected as shown below:

Column 8, Line 49 delete "LiNbO3" and insert --$LiNbO_3$--.

Signed and Sealed this

Seventh Day of December, 2010

David J. Kappos
*Director of the United States Patent and Trademark Office*